US012634372B1

(12) United States Patent
Iynoolkhan et al.

(10) Patent No.: US 12,634,372 B1
(45) Date of Patent: **\*May 19, 2026**

(54) INSPECTION AND ASSESSMENT BASED ON MOBILE EDGE-COMPUTING

(71) Applicant: Allstate Insurance Company, Northbrook, IL (US)

(72) Inventors: Younuskhan Mohamed Iynoolkhan, Rolling Meadows, IL (US); Surender Kumar, Palatine, IL (US); Nilesh Malpekar, Lincolnshire, IL (US); Charles Peavie, Lake Villa, IL (US)

(\*) Notice: Subject to any disclaimer, the term of this patent is extended or adjusted under 35 U.S.C. 154(b) by 0 days.

This patent is subject to a terminal disclaimer.

(21) Appl. No.: 17/238,302

(22) Filed: Apr. 23, 2021

Related U.S. Application Data

(63) Continuation of application No. 16/575,936, filed on Sep. 19, 2019, now Pat. No. 11,012,526.

(51) Int. Cl.
| | |
|---|---|
| *H04L 67/289* | (2022.01) |
| *B64C 39/02* | (2023.01) |
| *G06F 16/9538* | (2019.01) |
| *G06F 18/214* | (2023.01) |
| *G06N 20/00* | (2019.01) |
| *G06Q 10/10* | (2023.01) |

(52) U.S. Cl.
CPC .......... *H04L 67/289* (2013.01); *B64C 39/024* (2013.01); *G06F 16/9538* (2019.01); *G06F 18/214* (2023.01); *G06N 20/00* (2019.01); *G06Q 10/10* (2013.01)

(58) Field of Classification Search
CPC ... H04L 67/289; G06F 16/9538; G06N 20/00; G06K 9/62; G06K 9/6256; G06Q 10/10

USPC .......................................................... 709/213
See application file for complete search history.

(56) References Cited

U.S. PATENT DOCUMENTS

| | | | | |
|---|---|---|---|---|
| 8,510,196 B1 * | 8/2013 | Brandmaier | ........... | G06Q 40/08 |
| | | | | 705/35 |
| 9,202,382 B2 | 12/2015 | Klinger et al. | | |
| 9,390,451 B1 | 7/2016 | Slusar | | |
| 9,776,716 B2 | 10/2017 | Levien et al. | | |
| 9,805,261 B1 * | 10/2017 | Loveland | ............... | G06V 20/20 |
| 9,894,327 B1 * | 2/2018 | Jacob | ........................ | B60F 5/02 |

(Continued)

FOREIGN PATENT DOCUMENTS

WO 201722353 A1 2/2017

OTHER PUBLICATIONS

BetterView Integrates with Loss Control 360 for Drone Inspection, Unmanned Aerial Online, Jun. 20, 2019, 2 pages.

(Continued)

*Primary Examiner* — Ruolei Zong

(57) ABSTRACT

Methods, computer-readable media, software, and apparatuses may receive, at a field vehicle, field data from one or more unmanned autonomous vehicles, where the field data may be indicative of an item for assessment. Edge-computing, based on machine learning techniques, may be performed at the field vehicle to identify one or more characteristics of the assessment, and a projected cost may be determined. An estimate may be sent to a consumer. In some aspects, the projected costs may be based on local data related to a geographical location of the item. In another aspect, underwriting tasks may be performed at the field vehicle, and a quote may be sent to a consumer.

20 Claims, 7 Drawing Sheets

(56) References Cited

U.S. PATENT DOCUMENTS

| | | | | |
|---|---|---|---|---|
| 9,972,054 | B1* | 5/2018 | Konrardy | G07C 5/008 |
| 9,989,965 | B2 | 6/2018 | Cuban et al. | |
| 10,007,992 | B1 | 6/2018 | Harvey et al. | |
| 10,055,831 | B2 | 8/2018 | Loveland et al. | |
| 10,102,586 | B1* | 10/2018 | Marlow | G06Q 40/08 |
| 10,223,753 | B1 | 3/2019 | Marlow et al. | |
| 10,255,550 | B1* | 4/2019 | Simkoff | G06N 3/08 |
| 10,269,133 | B2 | 4/2019 | Hildreth | |
| 10,275,834 | B1 | 4/2019 | Tofte et al. | |
| 10,497,250 | B1* | 12/2019 | Hayward | G10L 15/26 |
| 10,635,903 | B1* | 4/2020 | Harvey | G06V 20/176 |
| 2002/0147681 | A1* | 10/2002 | Taninaka | G06Q 10/20 |
| | | | | 705/305 |
| 2003/0078798 | A1* | 4/2003 | Zaks | G06Q 10/10 |
| | | | | 705/305 |
| 2008/0312969 | A1* | 12/2008 | Raines | G06Q 10/10 |
| | | | | 705/4 |
| 2009/0265193 | A1* | 10/2009 | Collins | G06Q 30/0185 |
| | | | | 901/46 |
| 2015/0128034 | A1* | 5/2015 | Curbera | G06F 40/103 |
| | | | | 715/273 |
| 2016/0063642 | A1 | 3/2016 | Luciani et al. | |
| 2016/0364989 | A1 | 12/2016 | Speasl et al. | |
| 2017/0221110 | A1* | 8/2017 | Sullivan | G06Q 30/0278 |
| 2017/0270650 | A1* | 9/2017 | Howe | G06V 20/00 |
| 2018/0089763 | A1* | 3/2018 | Okazaki | G06N 3/0454 |
| 2018/0139152 | A1 | 5/2018 | Shaw et al. | |
| 2018/0314977 | A1* | 11/2018 | Jiang | G06N 20/10 |
| 2018/0330238 | A1 | 11/2018 | Luciw et al. | |
| 2018/0373931 | A1* | 12/2018 | Li | G06T 17/05 |
| 2019/0039545 | A1* | 2/2019 | Kumar | H04L 67/52 |
| 2019/0077519 | A1 | 3/2019 | Husain et al. | |
| 2019/0303982 | A1* | 10/2019 | Michel | G06V 20/13 |
| 2020/0098205 | A1* | 3/2020 | Dugas | G06V 20/10 |
| 2020/0111264 | A1* | 4/2020 | Kuruvilla | G06T 19/20 |
| 2020/0134753 | A1* | 4/2020 | Vickers | G06Q 40/08 |
| 2020/0143212 | A1* | 5/2020 | Okazaki | G06K 9/6271 |
| 2020/0258208 | A1* | 8/2020 | Lota | G06N 20/00 |
| 2020/0279367 | A1* | 9/2020 | White | G06N 3/08 |

OTHER PUBLICATIONS

Chmaj, Grzegorz & Selvaraj, Henry, "Distributed Processing Applications for UAV/drones: A Survey. Advances in Intelligent Systems and Computing," Progress in Systems Engineering: Proceedings of the Twenty-Third International Conference on Systems Engineering, Advances in Intelligent Systems and Computing, 2014, pp. 449-454; DOI 10.1007/978-3-319-08422-0_66. 1089.

A Tutorial on UAVs for Wireless Networks: Applications, Challenges, and Open Problems, Mozaffari et al., arXiv:1803.00680v2 [cs,UT] Mar. 17, 2019, 28 pages.

Decentralized Perimeter Surveillance using a Team of UAVs, IEEE Transactions on Robotics, Jan. 2008, 8 pages.

Distributed UAV-Swarm-Based Real-Time Geomatic Data Collection Under Dynamically Changing . . . , International Archives of the Photogrammetry, Remote Sensing and Spatial Information Services, vol. XL, International Conference of Unmanned Aerial Vehicles in Geomatic, Sep. 4-7, 2017, Bonn, Gem, Jun. 20, 2019, 14 pages.

Edge Computing for Situational Awareness, Satyanarayanan, School of Computer Science, Carnegie Mellon University, 978-1-5386-0728-2/17, 2017, IEEE, 6 pages.

Help from the Sky: Leveraging UAVs for Disaster Management, Drones, Erdelj et al., Pervasive Computing, Published by IEEE CS, 1536-1268/17, 2017 IEEE, 9 pages.

Survery on Coverage Path Planning with Unmanned Aerial Vehicles, Drones, MDPI, Cabreira et al., Drones 2019, 3, 4; doi:10.3390/drones 3010004, www.mdpi,com/journal/drones, 38 pages.

Drones and Location-Based Services: Using Drones in the Insurance Industry, Intellias, Jun. 19, 2019, Feb. 15, 2019, 13 pages.

A Networked Swarm Model for UAV Deployment in the Assessment of Forest Environments, Brust/Strimbu, arXiv:1607.04439v1 [cs.RO], Jul. 15, 2016, 6 pages.

A review and Future Directions of UAV Swarm Communication Architectures, Campion et al., Department of Electricl Engineering, University of North Dakota, 978-1-5386-5398-2/18/, 2018, IEEE, 6 pages.

Sep. 1, 2020—(US) Non-Final Office Action—U.S. Appl. No. 16/575,936.

Jan. 14, 2021—(US) Notice of Allowance—U.S. Appl. No. 16/575,936.

Karol T., "Developments in Insurance Company Drone Use," National Association of Mutual Insurance Companies, 2018, Retrieved from the Internet: URL: www.namic.org/pdf/publicpolicy/181210drones.pdf, 16 Pages.

* cited by examiner

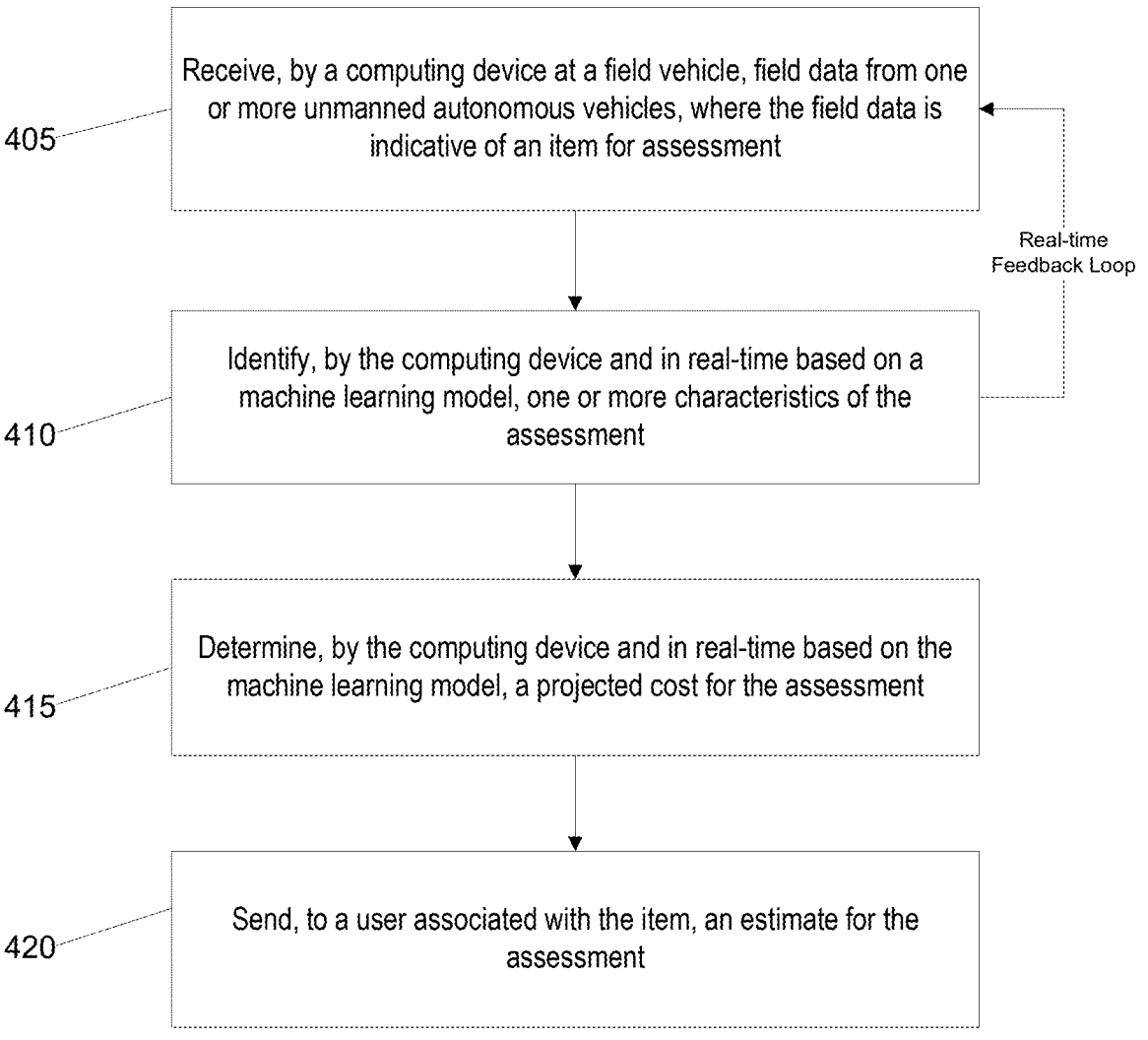

405 — Receive, by a computing device at a field vehicle, field data from one or more unmanned autonomous vehicles, where the field data is indicative of an item for assessment Real-time Feedback Loop 410 — Identify, by the computing device and in real-time based on a machine learning model, one or more characteristics of the assessment 415 — Determine, by the computing device and in real-time based on the machine learning model, a projected cost for the assessment 420 — Send, to a user associated with the item, an estimate for the assessment

FIG. 4

INSPECTION AND ASSESSMENT BASED ON MOBILE EDGE-COMPUTING

CROSS-REFERENCE TO RELATED APPLICATION

The present application is a continuation of co-pending U.S. patent application Ser. No. 16/575,936, filed Sep. 19, 2019, and entitled "Inspection and Assessment Based on Mobile Edge-Computing," the entire contents of which are incorporated in their entirety for all purposes.

FIELD OF ART

Aspects of the disclosure generally relate to methods and computer systems, including one or more computers particularly configured and/or executing computer software. More specifically, aspects of this disclosure relate to systems for receiving, analyzing and processing field data at a mobile edge-computing device, such as on a field vehicle, where the field data relates to an item to be inspected and/or assessed, and generating and providing a quote or an estimate to a consumer in real-time. In some aspects, the field vehicle may be autonomous, semi-autonomous, or non-autonomous.

BACKGROUND

Home inspection, commercial property inspection, claims assessment, and underwriting are generally time consuming, may not be cost-effective, and may be inefficient. Data is generally collected manually on-site and sent to a central processing unit for analysis. In some instances, multiple data collection efforts may be required over time to gather relevant data. Also, in some instances, insurance estimates may be generated without an assessment of local costs of materials, labor, and availability of the same. Also at least part of the assessment workflow may be manual, expensive and time consuming.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for decentralized and automated processing and data analysis on or near a location using edge-computing methodology and one or more unmanned autonomous vehicles ("UAVs"). As used herein, "unmanned autonomous vehicles" may include unmanned aerial vehicles, such as drones, flying vehicles, autonomous road vehicles, and so forth.

In some aspects, an edge-computing system may include an edge-computing data processing system and an edge-computing data analysis system. The edge-computing system may include at least one processor and a memory unit storing computer-executable instructions. In some embodiments, the computer-executable instructions may be stored in one or more non-transitory computer-readable media. The edge-computing system may be configured to, in operation, receive, by a computing device at a field vehicle, such as an unmanned autonomous vehicle ("UAV") carrier, field data from one or more UAVs, where the field data may be indicative of an item for assessment. The edge-computing system may be configured to, in operation, identify, in real-time based on a machine learning model, one or more characteristics of the assessment. The edge-computing system may be configured to, in operation, determine, in real-time based on the machine learning model, a projected cost for the assessment. The edge-computing system may be configured to, in operation, send, to a user associated with the item, an estimate for the assessment.

Deployed UAVs may generally have a shorter range due to limitations of power capabilities. Since UAVs may need to recharge their power source within short durations of being deployed, in some instances, it may be advantageous to have a UAV carrier deployed in the field. The UAV carrier may then allow UAVs to dock and recharge. The UAV carrier may also be equipped with an edge-computing device to deploy and manage UAVs in the field, receive data from them, analyze such data, and so forth.

In other aspects, the edge-computing system may also be configured to, in operation, analyze the field data to determine one or more of a type of material, an amount of material, an amount of labor, and an estimated time to complete a repair or a replacement.

In some aspects, the edge-computing system may, in operation, train the machine learning model to identify the one or more characteristics based on an analysis of the item.

In other aspects, the edge-computing system may also be configured to, in operation, determine, based on local data related to a geographical location of the item, a projected cost of material and a projected cost of labor.

In other aspects, the edge-computing system may also be configured to, in operation, dynamically update the local data.

In other aspects, the edge-computing system may also be configured to, in operation, cause, based on the one or more characteristics of the assessment, the one or more unmanned autonomous vehicles to collect additional field data.

In other aspects, the edge-computing system may also be configured to, in operation, perform, in real-time at the field vehicle, an underwriting task associated with the assessment.

In other aspects, the edge-computing system may also be configured to, in operation, train the machine learning model to perform the underwriting task.

Methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which:

FIG. 4 illustrates an exemplary method for edge-computing at a field vehicle in accordance with one or more aspects described herein.

DETAILED DESCRIPTION

Figure 1:
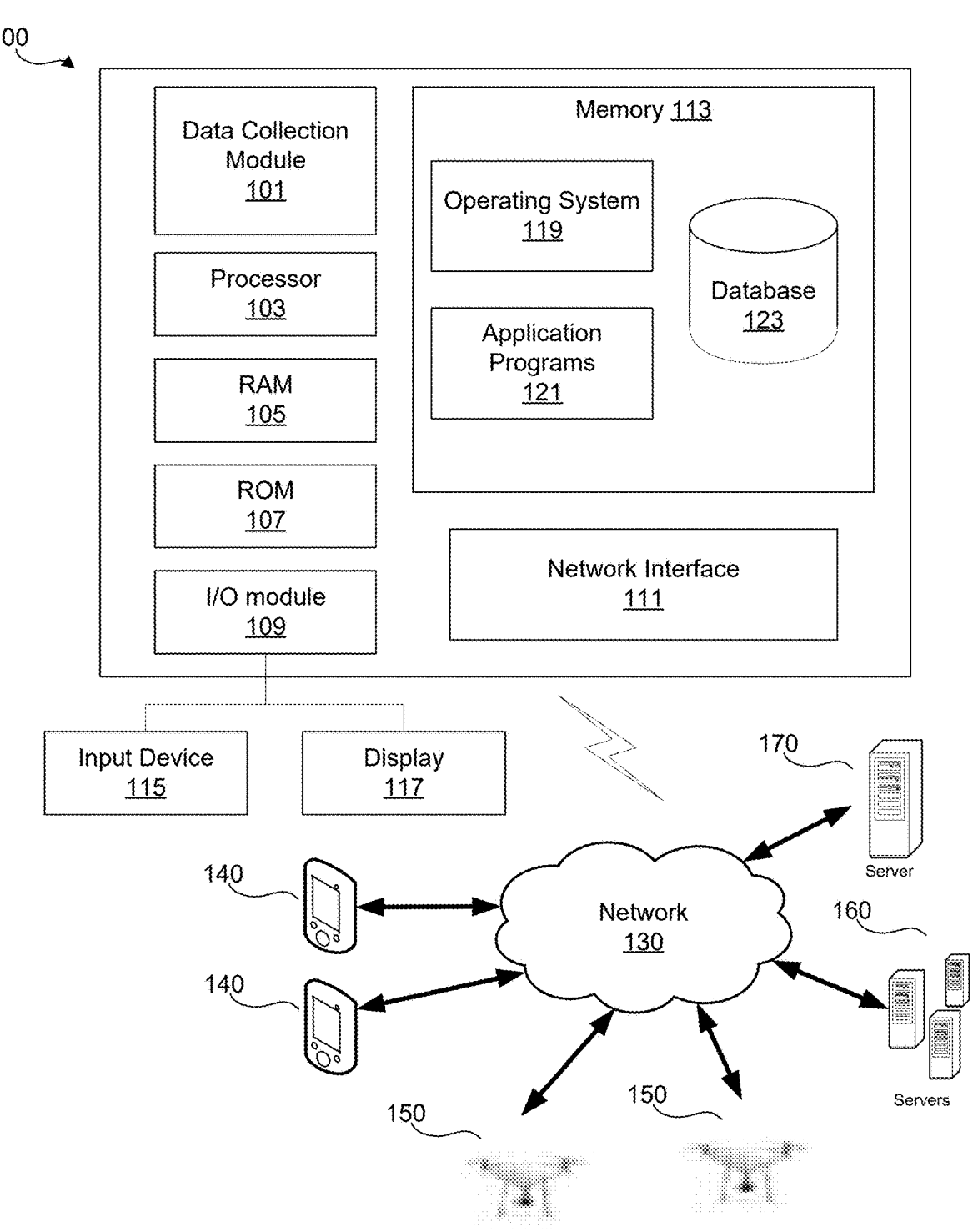
FIG. 1 illustrates an example edge-computing device that may be used in accordance with one or more aspects described herein.

In accordance with various aspects of the disclosure, methods, computer-readable media, software, and apparatuses are disclosed for performing edge-computation at a field vehicle. As described herein, processing claims and generating quotes may be a time consuming process. Generally, an insurance adjuster has to be on-site and manually collect field data. Such data may then be sent to a central processing center for further assessment and underwriting. Generally, data collection and data processing are sequential and may require multiple iterations to complete, thereby requiring the adjuster to return to an incident or property site multiple times. This may incur additional expenses and cause delays in processing the claims or property inspections.

In some instances, an incident site may be remote, and network connectivity may be intermittent. In some instances, due to a natural disaster such as tornado, lightning strike etc., the incident site may not be safe to perform a manual assessment by a field agent. In some instances, the available network may not be able to support an upload of field data files, such as high resolution images of damaged areas. Accordingly, the field agent may have to wait to return to an area with better network connectivity before transmitting data. In some instances, lower quality images may be transmitted to expedite claims processing, and this may in turn, lead to improper or incomplete claims assessments.

As described herein, one or more UAVs may collect field data from an incident site. A field vehicle may receive field data from the one or more UAVs in real-time, analyze the field data by utilizing on-board edge-computing capabilities, determine materials needed and estimate a cost of repair or replacement. In some aspects, the field vehicle may assess risk and perform underwriting tasks. The field vehicle may also generate a quote and send it to a consumer. Accordingly, the field vehicle may carry out tasks such as an assessment, an estimation, and quote generation without having to communicate with a central enterprise server. By performing real-time computations, the field vehicle is able to determine if additional field data may be needed, and may cause the deployed UAVs to collect such additional data. Such data collection and data processing may, in some examples, be performed simultaneously and one may inform the other in real-time. Also, for example, the field vehicle may be able to deploy fewer or additional UAVs in order to meet specific needs at the incident site or property.

Accordingly, in addition to saving time, network and storage cost savings may also be realized, labor cost savings may be realized by automating certain steps, safety and security of enterprise agents may be ensured by deploying UAVs in areas that may be dangerous for, and/or inaccessible to, humans, and accuracy and usefulness of the collected field data may be enhanced. Also, for example, efficiencies may be achieved by managing, coordinating, and deploying UAVs based on dynamic real-time needs. Additionally or alternatively, claims processing may be streamlined, and insurance claims may be assessed, processed and settled more rapidly. Also, for example, insurance policies may be underwritten quickly.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

In one or more arrangements, aspects of the present disclosure may be implemented with a computing device. FIG. 1 illustrates a block diagram of an example edge-computing device 100 that may be used in accordance with aspects described herein. The edge-computing device 100 may be a computing device on a field vehicle, such as a personal computer (e.g., a desktop computer), server, laptop computer, notebook, tablet, smartphone, etc. The edge-computing device 100 may be deployed on a carrier, such as, for example, a UAV carrier. Generally, as used herein, the term "edge-computing" may refer to computation that may be substantially performed in a periphery of a computing network, and proximate to a site of data collection. In some instances, edge-computing may include distributed computing. In the context of processing claims or performing underwriting tasks, an edge-computing device may be capable of storing relevant information and data, performing data gathering and data processing tasks close to an incident site or property, and making decisions, with a minimal need to communicate with a central server or a central database, and/or a minimal need for network connectivity. In some instances, such computing may be distributed between multiple field vehicles, and/or multiple UAVs. For example, field drones or UAVs may be deployed at a site of an incident, or at a property to be assessed. Such field drones may communicate with a field vehicle. The field vehicle and the field drones may be equipped with edge-computing devices, and distributed computing may be performed over this a network. In some embodiments, the field vehicle may not be at the site of the incident, but may be located in close proximity to the site. In some embodiments, the field vehicle and the field drones may form a part of a larger network of field vehicles and associated field drones. Also, for example, the network of multiple field vehicles and associated drones may form a part of an even larger communication network comprising a central server and a central database. In this regard, each field vehicle and its associated field drones may be considered to be peripheral devices in the larger network, and computing performed by each field vehicle and its associated field drones may be termed "edge-computing."

The edge-computing device 100 may have a data collection module 101 for retrieving and/or analyzing data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, edge-computing device 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the edge-computing device 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113.

The I/O module 109 may be configured to be connected to an input device 115, such as a microphone, keypad, keyboard, touchscreen, and/or stylus through which a user of the edge-computing device 100 may provide input data. The I/O module 109 may also be configured to be connected to a display device 117, such as a monitor, television, touchscreen, etc., and may include a graphics card. The display device 117 and input device 115 are shown as separate elements from the edge-computing device 100; however, they may be within the same structure. On some edge-computing devices 100, the input device 115 may be operated by an enterprise agent to interact with the data collection module 101, including providing information about an incident and/or preferences, customer information, account information, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the edge-computing device 100 to perform various functions. For example, memory 113 may store software used by the edge-computing device 100, such as an operating system 119 and application programs 121, and may include an associated database 123.

Although not shown in FIG. 1, various elements within memory 113 or other components in the edge-computing device 100, may include one or more caches, for example, CPU caches used by the processing unit 103, page caches used by the operating system 119, disk caches of a hard drive, and/or database caches used to cache content from database 123. For embodiments including a CPU cache, the CPU cache may be used by one or more processors in the processor 103 to reduce memory latency and access time. In such examples, the processor 103 may retrieve data from or write data to the CPU cache rather than reading/writing to memory 113, which may improve the speed of these operations. In some examples, a database cache may be created in which certain data from a central database such as, for example, one or more enterprise servers 160 (e.g., a claims database, an underwriting database, insurance customer database, local information database, etc.) is cached in a separate smaller database on an application server separate from the database server. For instance, in a multi-tiered application, a database cache on an application server can reduce data retrieval and data manipulation time by not needing to communicate over a network with a back-end database server such as, for example, one or more enterprise servers 160. These types of caches and others may be included in various embodiments, and may provide potential advantages in certain implementations of retrieving and analyzing field data and/or local data, such as faster response times and less dependence on network conditions when transmitting/receiving field data from deployed UAVs 150, data from one or more enterprise servers 160, and/or local data from one or more external servers 170, etc.

The network interface 111 may allow the edge-computing device 100 to connect to and communicate with a network 130. The network 130 may be any type of network, including a local area network (LAN) and/or a wide area network (WAN), such as the Internet, a cellular network, or satellite network. Through the network 130, the edge-computing device 100 may communicate with one or more other computing devices 140, such as laptops, notebooks, smartphones, tablets, personal computers, servers, vehicles, home management devices, home security devices, smart appliances, etc. Through the network 130, the edge-computing device 100 may communicate with one or more UAVs 150. The UAVs 150 may also be equipped with respective edge-computing devices configured in a similar manner as edge-computing device 100. Through the network 130, the edge-computing device 100 may communicate with one or more enterprise servers 160 to exchanges related insurance information and data. Through the network 130, the edge-computing device 100 may communicate with one or more external servers 170 to access local/market data.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. Further, the network interface 111 may use various protocols, including TCP/IP, Ethernet, File Transfer Protocol (FTP), Hypertext Transfer Protocol (HTTP), etc., to communicate with other computing devices 140, UAVs 150, enterprise servers 160, and external servers 170.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, LTE, and WiMAX, is presumed, and the various computing devices and mobile device location and configuration system components described herein may be configured to communicate using any of these network protocols or technologies.

Figure 2:
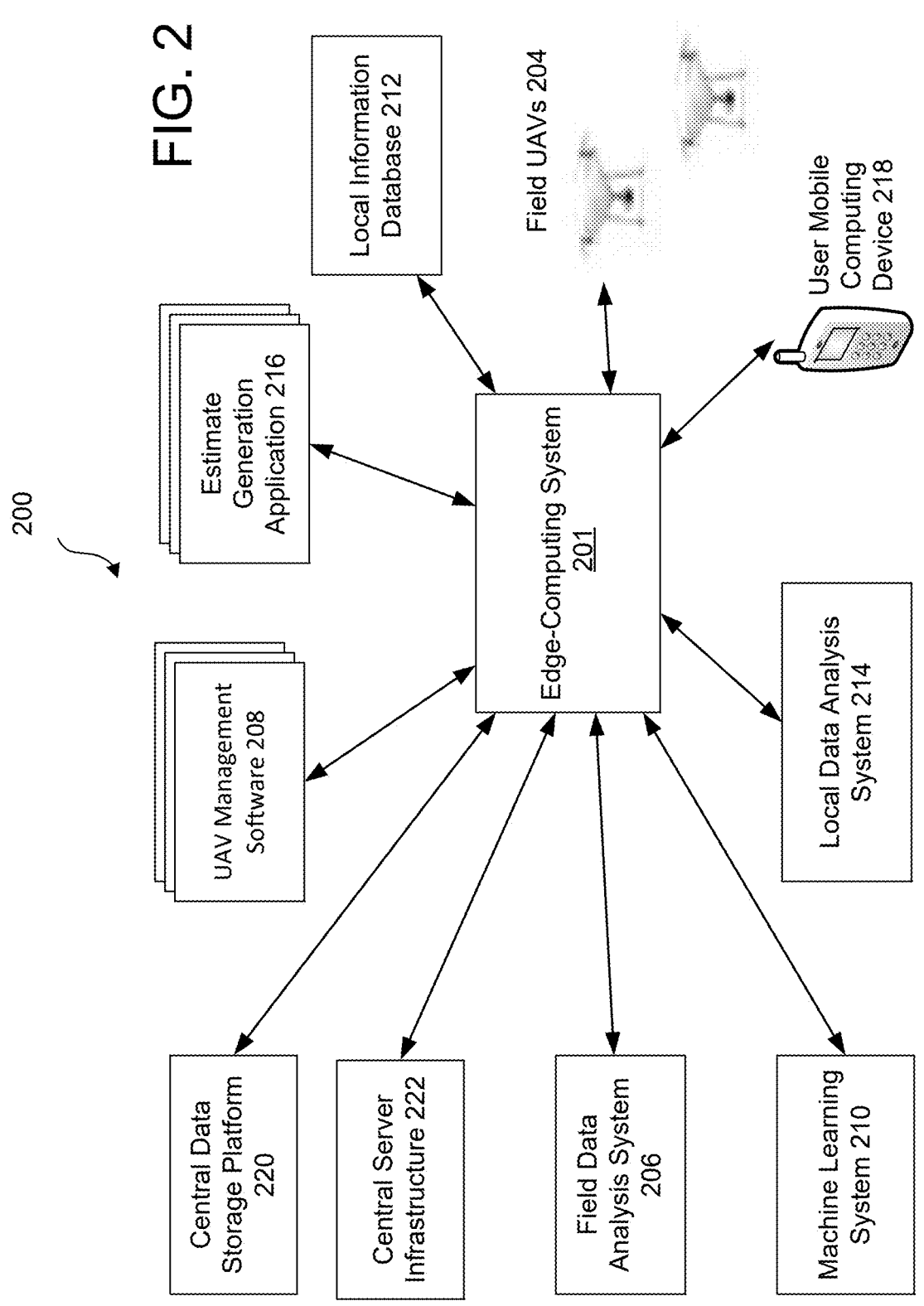
FIG. 2 shows a block diagram illustrating the system architecture for an edge-computing system in accordance with one or more aspects described herein.

FIG. 2 shows a block diagram illustrating system architecture 200 for an edge-computing system in accordance with one or more aspects described herein. An edge-computing system 201 may receive field data from Field UAVs 204. In some instances, the edge-computing system 201 may be an edge-computing device 100, as shown in FIG. 1. In some instances, edge-computing system 201 may be housed on a field vehicle. The field vehicle may be a vehicle that is equipped with edge-computing system 201 to perform the processes described herein, and is equipped to communicate with other vehicles, field vehicles, field UAVs, devices, servers, databases, etc. over a network. The field vehicle may be autonomous, semi-autonomous or non-autonomous. In some embodiments, the field vehicle may be a UAV, a flying vehicle, a mobile home, a recreational vehicle, etc. In some embodiments, the field vehicle may manage a fleet of UAVs. In some embodiments, the field vehicle may manage a fleet of other field vehicles. In some embodiments, the field vehicle may be a UAV carrier, or a field vehicle that manages a fleet of UAV carriers, and/or manages a fleet of UAVs. In some embodiments, the field vehicle may comprise a UAV docking station that houses and charges one or more UAVs. For example, the field vehicle may be physically configured to allow UAVs to dock. In some embodiments, the field vehicle may transport the UAVs from one location to another. Also, for example, the field vehicle may allow the UAVs to charge their power supplies. As another example, the field vehicle may provide network connectivity to the autonomous vehicles. In some embodiments, the field vehicle may include a server, a network interface that facilitates communications over private and public networks, and may be equipped with an artificial intelligence/machine learning system.

It may be noted that UAVs are used herein for illustrative purposes only. Field UAVs may be 204 are depicted herein as drones; however Field UAVs 204 may be any type of unmanned vehicle such as aerial, ground, marine, interstellar, etc. Also, nothing in this description precludes the field vehicle to receive data from other field vehicles.

Edge-computing system 201 may receive local data through channels such as local information database 212, and central data storage platform 220. The edge-computing system 201 may communicate with one or more network-based servers to detect market information associated with an insurance estimate.

In some embodiments, edge-computing system 201 may collect information from and transmit information to each of the various applications, databases, devices, and backend servers described in FIG. 2. For example, edge-computing system 201 may receive information about materials and labor costs, costs of permits, including real-time availability of labor.

In some embodiments, edge-computing system 201 may communicate with Field UAVs 204 (e.g., one or more deployed drones) and receive field data related to an incident or property inspection. The incident may be any type of incident that may require an insurance claim to be filed and processed. For example, the incident may be an accident, a home fire, a weather related incident (e.g., hail damage, tornado damage, hurricane damage, wind damage, flood damage, damage due to a fallen tree, etc.), basement flooding due to a malfunctioning sump pump, and so forth. The property can be a home in a residential area or a commercial building being assessed for insurability and coverage.

Edge-computing system 201 may collect field data from real-time interactions with Field UAVs 204. For example, Field UAVs 204 may collect audiovisual data and transmit such data to the edge-computing system 201. For example, in some instances, Field UAVs 204 may detect damage to a roof and capture aerial views of the damage from different angles and perspectives. Also, for example, Field UAVs 204 may detect flooding in an area, and may capture aerial images of the impacted area. As another example, Field UAVs 204 may be at an accident site and may capture real-time images of the disposition of the vehicles involved, capture real-time weather and/or traffic conditions, capture detailed images of damage to vehicles, and so forth. In some instances, Field UAVs 204 may unlock a home via a secured encrypted key and perform internal property inspections. Real-time data may be transmitted by the UAV to the edge-computing system 201. Field UAVs may detect a type of material of a roof and/or other structural elements of the building for assessment of replacement costs.

The field data may be analyzed by field data analysis system 206. For example, field data analysis system 206 may analyze images of roof damage and determine a type of roof, material used, a type and extent of damage, and so forth. As another example, field data analysis system 206 may analyze images of a flooded area, determine a number of homes that may be impacted, determine a level of water, and so forth. In some embodiments, field data analysis system 206 may access a local cache for home data related to the impacted area. For example, a hundred homes may have been affected by an overflowing river. Field data analysis system 206 may analyze images of the homes, and retrieve information about one or more of these homes from a local cache. For example, field data analysis system 206 may determine how may homes have a basement. Also, for example, field data analysis system 206 may determine, for each home, a height above the ground level, compare this data with a height of the flooded water, and determine what, if any, levels of the home are impacted.

As another example, field data analysis system 206 may analyze images of an automobile accident, and analyze images of a target automobile. For example, field data analysis system 206 may determine the extent of damage. For example, images may indicate that a windshield is shattered by the impact. As another example, the images may indicate that passenger side doors of the automobile have been damaged. In some instances, field data analysis system 206 may be able to determine a color, make and model of the automobile from the images. Additionally and/or alternatively, field data analysis system 206 may retrieve vehicle related data from the central data storage platform 220. Also, for example, field data analysis system 206 may determine a type of repair, a type of parts, a list of proximate vehicle repair service centers that may service the type of vehicle, and so forth.

In an embodiment, edge-computing system 201 may utilize machine learning system 210 to assist with various steps in data collection, assessment, analysis, and estimate generation. For example, machine learning system 210 may coordinate with UAV management software 208, to determine a number of UAVs to be deployed at the incident site, the type of data each UAV is to collect, and so forth. For example, if wind damage to a home is detected and due to ongoing, heavy rainfall, the damage may need to be restored at the earliest. Accordingly, based on the weather-related conditions, machine learning system 210 may cause deployment of weather-proof UAVs, and/or UAVs with cameras that are water-proofed. Also, for example, based on an initial image of a type and extent of damage to a roof, machine learning system 210 may cause deployment of additional UAVs to assist Field UAVs 204. Also, for example, depending on a type of task (e.g., inspecting a property, inspecting a natural disaster, hail damage, tornado damage), geographic area, and safety considerations, machine learning system 210 may automatically determine a type of field vehicle to send (e.g., flying vehicle, flying car, autonomous vehicle, or a drone carrying multiple drones) and how many field vehicles to deploy.

UAV management software 208 may be configured to manage UAV resources. For example, UAV management software 208 may be configured to track Field UAVs 204, maintain a log of their flight/travel paths, how much charge may remain, non-deployed UAVs, a list of UAV capabilities (e.g., heat resistant, waterproof, size, whether or not they are equipped to perform edge-computing, and so forth). Accordingly, machine learning system 210 may utilize the dynamic, real-time information from the UAV management software 208 to optimize computing power, network capabilities, collection of data, deployment and coordination of UAVs, etc.

Based on a real-time analysis of the field data, UAV management software 208 may cause Field UAVs 204 to collect additional field data. For example, an image of a siding of a home may indicate potential damage to a window. Accordingly, UAV management software 208 may direct Field UAVs 204, or deploy an additional UAV, to capture additional images (e.g., using an image capture device of the UAV) of the potentially damaged window. Also, for example, Field UAVs 204 may have sent an image of damage to one side of a roof. However, based on a direction of wind and an amount of rain, machine learning system 210 may infer that there is potential damage to a different portion of the roof. Accordingly, UAV management software 208 may direct Field UAVs 204, or deploy an additional UAV, to capture additional images of the potentially damaged portions of the roof.

Such a real-time analysis and feedback loop facilitates timely and efficient collection of field data, reduces errors, and increases time efficiencies. For example, instead of waiting for an insurance adjuster to capture and send images, which are then processed at a central server to identify deficiencies in data collections, and the adjuster is then asked to go to the field again for additional field data, edge-computing system 201 may accomplish such tasks in real-time and dispatch additional field UAVs for data collection as necessary. Accordingly, rather than collecting field data and then performing the analysis, data collection and analysis may not be sequential, but may be performed simultaneously, with real-time analysis informing the data collection process in real-time.

Also, for example, in the case of severe weather conditions, such as tornados, if an impacted area, and a number of properties impacted are known, then machine learning system 210 may determine how many UAVs may be needed depending on the number of impacted properties. The UAVs may quickly perform the assessment, and determine the replacement cost. In some instances, based on information about the incident, central server infrastructure 222 may make a decision to deploy decentralized field vehicles (a number of field vehicles, region of deployment, time of deployment, initial tasks, etc.), and once the decentralized field vehicles are on-site (or within a proximate range), the field vehicles may determine how many Field UAVs 204 are to be deployed. In some instances, two or more field vehicles may coordinate among themselves to determine an assignment for Field UAVs 204. In some instances, two or more field vehicles may coordinate among themselves to perform distributed edge-computing. For example, a first field vehicle may perform analysis of the field data, a second field vehicle may perform a cost estimate analysis based on local data, and a third field vehicle may perform underwriting tasks and generate quotes. In some instances, Field UAVs 204 may coordinate with each other on-site to identify and/or perform distributed tasks.

In some embodiments, for a property inspection, data from enterprise central data storage platform 220 may indicate that a property has multiple points of entry. Accordingly, a field vehicle may deploy multiple UAVs so as to collect field data simultaneously. For example, the property may be on fire, and it may be of great importance to capture images of the property as quickly as possible before the fire destroys the property. Accordingly, the field vehicle may configure and direct multiple UAVs to distribute field data collection tasks so as to maximize fact gathering.

In an embodiment where multiple field vehicles and/or UAVs may be deployed, the field vehicles and/or UAVs may form a part of a networked mesh where devices communicate with one another to optimize data collection and analysis. In some embodiments, a field vehicle may be selected to be a lead field vehicle that directs and manages a fleet of field vehicles. Similarly, one of Field UAVs 204 may be selected to be a lead UAV on-site, and may be configured to manage and direct other deployed UAVs in the field. For example, in the case of a fire destroying a property, the lead UAV may quickly assess sections of the property that have not yet been destroyed, and deploy multiple UAVs to quickly capture field data from those sections. Also, for example, the lead UAV may deploy one or more fire resistant UAVs to capture field data from the sections of the property that are burning.

Generally, edge-computing system 201 may make local determinations to allocate resources, identify a best route to incident site, determine how to use distributed computing to maximize computing power, battery power, and the like, and based on this, determine how many UAVs to deploy, a type and extent of field data to collect, etc. Multiple field vehicles, UAV carriers, and/or UAVs may coordinate amongst themselves to perform the tasks.

In some embodiments, field data analysis system 206 may detect damage to a roof and determine an extent of the damage. For example, the roof may be comprised of shingles and field data analysis system 206 may determine a number of shingles. In some embodiments, machine learning system 210 may analyze the image and determine a type and color of shingle that is in use as roof material.

In some embodiments, edge-computing system 201 may collect local data related to a cost of materials and cost of labor. Such data may be collected from a local information database 212. In some embodiments, local information database 212 may be an aggregate of information retrieved from a variety of sources, public and private. For example, public sources of information may be available on the world wide web, or via a website of a company. The local information database 212 may be updated periodically. For example, edge-computing system 201 may maintain a dynamic inventory of appliances, parts, suppliers, repair companies, availability of human resources, rates for hourly wages for different types of work, time taken to perform the work, and so forth. For example, edge-computing system 201 may maintain a dynamic inventory of various parts and accessories, and prices thereof, for vehicles based on their year, make, model, color, etc. Also, for example, edge-computing system 201 may maintain a dynamic inventory of home appliances, and prices thereof, based on their year, make, model, color, etc. In some embodiments, local data analysis system 214 may monitor one or more databases, or the Internet in general.

In some embodiments, edge-computing system 201 may determine a cost of material associated with the repair and/or restoration. For example, edge-computing system 201 may determine that the type of roof shingle is an algae resistant shingle in hunter green color. Based on information from the local information database 212, local data analysis system 214 may determine that the particular shingle is available from a local store at $31.10 per shingle of size 33.33 square feet. In some embodiments, machine learning system 210 may compare one or more characteristics of the existing shingle with those of a replacement shingle to determine if they match in size, color, etc. For example, the existing shingle may also be of size 33.33 square feet. In such instances, edge-computing system 201 may determine a cost of the material based on a number of shingles needed and a price per shingle. In some instances, the existing shingle may not be of size 33.33 square feet size and, based on an age of the roof, edge-computing system 201 may determine that a replacement for the existing shingles is not available. Accordingly, edge-computing system 201 may determine that shingles for the entire roof may need to be replaced.

In some embodiments, machine learning system 210 may estimate characteristics of a repair by analyzing a size of the damaged portion, age of the item, availability of replacement parts and/or accessories, and a cost of repair. For example, if a few shingles are damaged on a roof, machine learning system 210 may determine that the shingles may be replaced with other shingles (even shingles that are very close in material and/or color). On the other hand, if a large number of shingles are damaged, then machine learning system 210 may determine that shingles for the entire roof may be replaced.

As another example, water damage may be restricted to a small portion of a hardwood flooring, and machine learning system 210 may determine that a few of the wooden planks may need to be replaced, restored, sanded, and/or stained in order to restore the hardwood floor. On the other hand, if a large portion of the hardwood floor is damaged, then machine learning system 210 may determine that the entire flooring may need to be replaced.

Estimate generation application 216 may be configured to generate an estimate or a quote based on a determination of material and labor costs. For example, edge-computing system 201 may identify an availability of labor and a cost of the available labor. For example, local information database 212 may be dynamically updated to store labor deployment patterns. In some embodiments, edge-computing system 201 may determine that an area is impacted by a severe thunderstorm, and most of the labor resources have been diverted to perform emergency services at this area. Accordingly, edge-computing system 201 may determine that more expensive labor may be available to repair the roof within a month, or that labor costs are likely to decline based on a projected time for the disaster relief efforts to be concluded. Accordingly, estimate generation application 216 may adjust labor costs and an estimated time to complete roof repairs based on cost of labor and availability of labor, and generate a quote based on such information.

As another example, field data analysis system 206 may identify that a vehicle's windshield, and passenger side front door may need to be replaced. Accordingly, local data analysis system 214 may identify a replacement cost for parts and labor. Estimate generation application 216 may generate a quote based on the estimated costs.

In some embodiments, estimate generation application 216 may perform tasks associated with processing an insurance claim. Generally, claims may be transmitted to central server infrastructure 222 for a manual process. However, as described herein, such claims processing may be performed locally at a field vehicle (e.g., a UAV carrier) that is equipped with an edge-computing platform. For example, edge-computing system 201 may store, in a local database and/or make available via a cache, one or more forms that may be needed for claims processing. Based on customer information, estimate generation application 216 may prepopulate such forms with customer information such as name, date of birth, driver's license information where relevant, residential address, a phone number, and so forth.

Also, for example, estimate generation application 216 may coordinate with machine learning system 210 to identify a likely outcome of similar claims that were previously processed. As another example, estimate generation application 216 may coordinate with machine learning system 210 to identify a type of incident. For example, if the claim arose out of a known weather event with predictable damages, and the one or more characteristics of the assessment are consistent with the predictable damages, then estimate generation application 216 may be more likely to allow the claim to be successful.

In some embodiments, estimate generation application 216 may perform underwriting tasks associated with processing a request for an insurance policy. For example, edge-computing system 201 may have available one or more actuarial models, statistical models, and/or other risk assessment tools that facilitate evaluation of claims or estimation of a property replacement cost. Accordingly, estimate generation application 216 may utilize a consumer's claims history, a number and type of existing policies, data related to home or commercial property ownership, permits data, maintenance of the property, vehicle ownership, mortgage payments, review deductibles and limits for existing policies, and utilize such factors for underwriting purposes. Based on such data, estimate generation application 216 may establish pricing for acceptable insurance risks and generate a quote.

In some embodiments, estimate generation application 216 may determine insurability of a property at a time of renewal, as well as a replacement cost estimate for the property. For example, a field vehicle may receive an indication that a property needs to be assessed for insurability. Based on a type of property (footprint, floors, ingress/egress, external features, etc.), a location (rural, metropolitan, suburban, etc.), zoning (residential, agricultural, commercial, etc.), the field vehicle may identify a type UAV to be deployed. In some embodiments, machine learning system 210 may determine appropriate parameters based on such factors, and edge-computing system 201 may configure and direct the identified UAV to inspect the property from an underwriting perspective. For example, the UAV may be configured to perform measurements, determine age of a roof, an age of the windows, any special structural features, sizes and types of doors and window, and other external features, type of flooring, carpeting, etc. and thereby minimize human error. The field data may be processed by the edge-computing data processing system 302 and estimate generation application 216 may perform underwriting tasks at the time for renewal.

In some embodiments, estimate generation application 216 may determine insurability of a vehicle, based at least in part, on an analysis of its travel route. For example, a UAV may be configured to provide field data about traffic patterns, accidents, delays, mileage, fuel consumption, estimated wear and tear of the vehicle, etc. along the travel route. A risk assessment may be performed based on the field data, and estimate generation application 216 may perform underwriting tasks for the vehicle.

In some embodiments, estimate generation application 216 may perform initial underwriting tasks and transmit the underwriting file to central server infrastructure 222 for further processing. In some embodiments, estimate generation application 216 may complete the underwriting tasks without communicating with central server infrastructure 222. In some embodiments, estimate generation application 216 may determine that no underwriting is required. For example, an analysis of the field data from an inspection of the property at the time for renewal may reveal that no changes have been made to the property since the last inspection. Accordingly, machine learning system 210 may determine that the risk profile of the property has not changed, and based on such a determination, estimate generation application 216 may determine that no further underwriting may be needed.

In some embodiments, for renewal related inspections, underwriting data from a field vehicle may be synchronized with policy administration and underwriting systems, for example at central server infrastructure 222, to update a policy record in real-time when network connectivity is available. In some embodiments, in an absence of network connectivity, policy records may be queued to be updated later when network connectivity becomes available.

In some embodiments, machine learning system 210 may access historical data about the property and identify changes that may have occurred. For example, an external inspection may indicate that a backyard was converted into a parking structure or a trampoline is installed in the backyard. Also, for example, an aerial inspection may reveal that an in-ground pool has been built. Such and other features may then be taken into account to assess risks, and machine learning system 210 may be trained to determine insurability of the property based on properties of a similar size, similar features, at a similar location, etc.

In some embodiments, a generated quote or estimate may be sent to a consumer directly without any communication with the central server infrastructure 222. For example, estimate generation application 216 may generate the quote and edge-computing system 201 may provide the quote to the consumer, for example, by sending an electronic mail, and/or by displaying the quote via a graphical user interface on the consumer's mobile computing device 218.

Although field data analysis system 206, UAV management software 208, machine learning system 210, local data analysis system 214, and estimate generation application 216 are shown as separate elements from the edge-computing system 201; however, one or more of them may be within the same structure.

Figure 3:
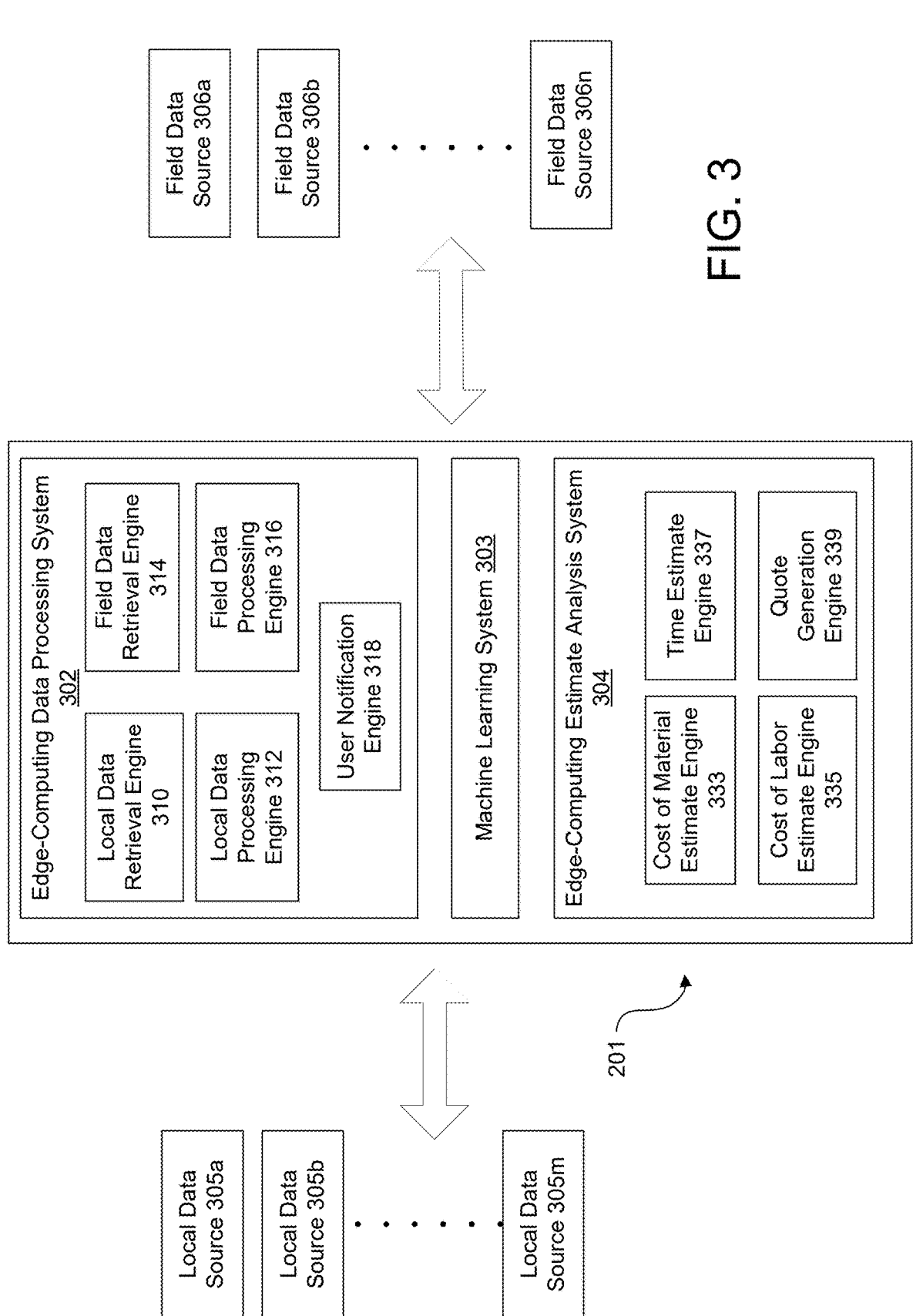
FIG. 3 illustrates a block diagram of an edge-computing system that collects information from various data sources to generate an estimate in accordance with one or more aspects described herein.

FIG. 3 illustrates a block diagram of an edge-computing system 201 that collects information from various data sources to generate an estimate in accordance with one or more aspects described herein. As shown in FIG. 3, the edge-computing system 201 may communicate with a plurality of local information data sources 305a, 305b . . . 305m to collect information related to the consumer and the consumer's accounts.

In some embodiments, the edge-computing system 201 may comprise an edge-computing data processing system 302, a machine learning system 303, and an edge-computing estimate analysis system 304. The edge-computing data processing system 302 may receive field data from the plurality of field information data sources 306a-306n (e.g., a plurality of deployed UAVs). The field data retrieval engine 314 may be configured to monitor (e.g., continuously monitor) and track (e.g., continuously track) the deployed UAVs to determine if new field data is being transmitted. The field data processing engine 316 may be configured to process, in real-time, the incoming field data.

In some embodiments, field data processing engine 316 may be configured to generate, in real-time, three-dimensional ("3-D") models of a site based on two-dimensional images. Such 3-D models may provide dimensional information about angles, distances etc. For example, edge-computing data processing system 302 may utilize the information about distances from 3-D models to estimate a size of an impacted region. Also, for example, edge-computing data processing system 302 may utilize the information about angles from 3-D models to determine if additional field data may need to be collected.

The edge-computing data processing system 302 may also retrieve information from the plurality of local data sources 305a-305m in order to determine material and labor costs and available resources. The local data retrieval engine 310 may be configured to monitor (e.g., continuously monitor) each of the local data sources 305a-305m and report data of interest from any one of these data sources to the edge-computing system 201. For example, the local data retrieval engine 310 may monitor local suppliers of materials for home repairs to determine if prices for materials have changed. Also, for example, the local data retrieval engine 310 may monitor local vehicle repair shops to determine how busy they may be and an estimated time taken to complete repairs. If the information is detected, it may be passed on to the edge-computing system 201 for analysis. The local data processing engine 312 may be configured to process, in real-time, the incoming local data to maintain a current estimate of labor costs, labor resources, etc.

In some additional embodiments, edge-computing estimate analysis system 304 may generate a listing for the consumer of repairs and estimated costs and estimated time to perform the repairs. For example, cost of material estimate engine 333 may estimate a cost of materials needed for the repairs based on output from the local data processing engine 312. Also, for example, cost of labor estimate engine 335 may estimate a cost of labor needed for the repairs based on output from the local data processing engine 312. As another example, time estimate engine 337 may estimate a time needed for the repairs based on output from the local data processing engine 312.

In an embodiment, machine learning system 303 may utilize one or more machine learning models to assist edge-computing data processing system 302 and edge-computing estimate analysis system 304. As described herein, machine learning system 303 may analyze historical field data to associate images with types of damage, extent of damage, type of material, and so forth. In some embodiments, machine learning system 303 may determine a size of an impact. For example, based on a known measurement of objects appearing in an image, machine learning system 303 may learn to determine a size of a damaged area. For example, if hardwood flooring in a room is known to cover 180 square feet, then machine learning system 303 may identify the damaged portion of the hardwood flooring, and based on a comparison of relative areas in the photographic image with the actual floor dimensions, machine learning system 303 may determine a size of the impacted portion of the flooring.

Also, for example, machine learning system 303 may be trained to associate images of materials with granularity, color, hues, patterns, material, and so forth to determine a type of material. As another example, machine learning system 303 may be trained to associate images with a type of object (e.g., car, bicycle, roof, siding, carpet, hardwood, etc.). Also, for example, machine learning system 303 may be trained to analyze audio and/or visual data to determine if it's a water-related incident, a fire-related incident, a structural issue, an earthquake-related incident, etc. As another example, machine learning system 303 may be trained to analyze images to determine a geographic region that may be impacted, and quickly determine resources that may be available. For example, upon a determination that the affected area is a rural region, machine learning system 303 may be trained to identify nearby available resources, and estimate a time taken for the resources to arrive.

In some embodiments, machine learning system 303 may be trained to perform trend analysis on a cost of materials, cost of labor and/or a time for repairs. Based on the trend analysis, machine learning system 303 may be trained to perform predictive analysis to determine projected costs for materials, projected costs for labor, and a projected estimate for time for repairs.

In some embodiments, machine learning system 303 may be trained to analyze a historical record of incidents, damages, and repairs performed to learn patterns that facilitate claims processing. For example, based on an image on an accident, machine learning system 303 may be trained to learn to make an initial determination of fault, position of passengers within an impacted vehicle, potential types of personal injuries sustained, types of damage to the vehicle, and estimate costs based on parts and labor.

In some embodiments, machine learning system 303 may be trained to update the one or more actuarial models, statistical models, and/or other risk assessment tools that facilitate evaluation of claims and that facilitate the underwriting process, as described herein. Generally, machine learning system 303 may be trained based on different training datasets and/or learning models for different use cases and types of damage. In some instances, although artificial intelligence and machine learning may occur locally at edge-computing system 201, central server infrastructure 222 may also collect data from different field vehicles in the field, apply techniques based on artificial intelligence, and provide instructions to field vehicles based on the analytics. Accordingly, the local models (e.g., machine learning system 303) may be periodically updated and coordinated in a mesh network.

Quote generation engine 339 may generate an inspection report, determine the inspection cost, generate a quote for monthly or annual premium for insuring a property, generate a quote for a claim, an assessment report, and determine an estimate for the loss, an amount paid by the insurance company, and/or a deductible to be paid by the consumer. In some aspects, quote generation engine 339 may perform one or more tasks performed by estimate generation application 216.

In some embodiments, quote generation engine 339 may be configured to perform one or more aspects of a marketing campaign. For example, intelligence data may be gathered from the field to inform future marketing and sales strategies. Generally, in some instances, UAVs may be configured to map geographical areas and determine insurability of properties and provide that information to central server infrastructure 222. For example, a field vehicle may identify a region where an insurance company has particularly favorable ratings. In some embodiments, such information may be received from, for example, the plurality of local data sources 305a-305m. In some embodiments, edge-computing data processing system 302 may estimate homes in the identified region, and quote generation engine 339 may generate quotes etc. and depending on favorability, user notification engine 318 may provide a quote, or communicate in another manner with the respective homeowners. In some instances, information about homes may be received via the plurality of field data sources 306a-306n, and a marketing campaign may be automatically generated.

User notification engine 318 may send the inspection report, the quote, the assessment report, etc. to a target consumer. In some embodiments, user notification engine 318 may cause an amount of money to be deposited via electronic transfer in a consumer's preferred banking account.

FIG. 4 depicts an exemplary method for edge-computing at a field vehicle in accordance with one or more aspects described herein.

At step 405, edge-computing system 201 may receive, by a computing device at a field vehicle, field data from one or more UAVs (e.g., Field UAVs 204), where the field data may be indicative of an item for assessment. For example, edge-computing system 201 at a field vehicle may receive field data from deployed UAVs. The field data may relate to a property being assessed for an insurance policy.

At step 410, edge-computing system 201 may identify, by the computing device and in real-time based on a machine learning model, one or more characteristics of the assessment. For example, edge-computing system 201 may apply a machine learning model to identify changes to the property (e.g., a new pool, a new deck, a new roof, etc.).

In some embodiments, edge-computing system 201 may analyze the field data to determine one or more of a type of material, an amount of material, an amount of labor, and an estimated time to complete the repair. For example, the roof of a property may have suffered hail damage. Accordingly, edge-computing system 201 may apply a machine learning model to identify a type of roof, roof material, color, a number of shingles (if it is a shingle based roof), an extent of damage, etc. Based on such information, edge-computing system 201 may determine if the roof is to be repaired or replaced, determine a cost estimate for repair or replacement of the roof, identify available labor resources, determine labor costs, and estimate a time for the repair or replacement.

In some embodiments, edge-computing system 201 may train the machine learning model to identify the one or more characteristics based on an analysis of the item. In some instances, the analysis may be an image analysis. For example, the machine learning model may be trained to, based on historical images, determine a size of the property, and a type of damage. Also, for example, the machine learning model may be trained to learn labor and material costs in the area where the property is located, and based on image analysis, learn over time what restoration may be needed (how much siding, how many doors may need repair, how many window panes may need to be replaced etc.), and then estimate the cost. Edge-computing system 201 may encounter instances where the machine learning model may not be able to analyze the field data based on the training dataset. In such instances, edge-computing system 201 may collect additional field data and/or generate additional training datasets for the machine learning model to learn over time.

In some embodiments, edge-computing system 201 may cause, based on the one or more characteristics of the assessment, the one or more UAVs to collect additional field data. For example, in some embodiments, the process may enter a feedback loop and return to step 405. For example, real-time analysis of field data may indicate that additional images may need to be captured. Accordingly, deployed UAVs at the property may be directed to collect and transmit additional field data.

At step 415, edge-computing system 201 may determine, by the computing device and based on the machine learning model, a projected cost for the assessment. For example, the machine learning model may perform trend analysis for cost of local materials and labor. Accordingly, based on an analysis of a type of repair, edge-computing system 201 may rely on the machine learning model to perform predictive analysis based on, for example on the trend analysis, to determine a projected cost for the repairs. In some embodiments, edge-computing system 201 may determine, based on local data related to a geographical location of the item, a projected cost of material and a projected cost of labor.

In some embodiments, edge-computing system 201 may dynamically update local data related to material costs and labor costs. For example, as local data for labor resources, material costs etc. change, edge-computing system 201 may dynamically update its database, update the machine learning models, etc.

In some embodiments, edge-computing system 201 may perform, in real-time at the vehicle carrier, an underwriting task associated with the assessment. As described herein, edge-computing system 201 may analyze field data to assess risk, and perform automatic underwriting tasks based on the risk assessment. As described herein, the machine learning model may be trained to learn the underwriting task.

At step 415, edge-computing system 201 may send, to a user associated with the item, an estimate for the assessment. For example, edge-computing system 201 may generate a quote for an insurance policy and provide the quote to a consumer. Also, for example, edge-computing system 201 may generate an estimate for repair or replacement, and may send the estimate to a consumer.

Figure 5:
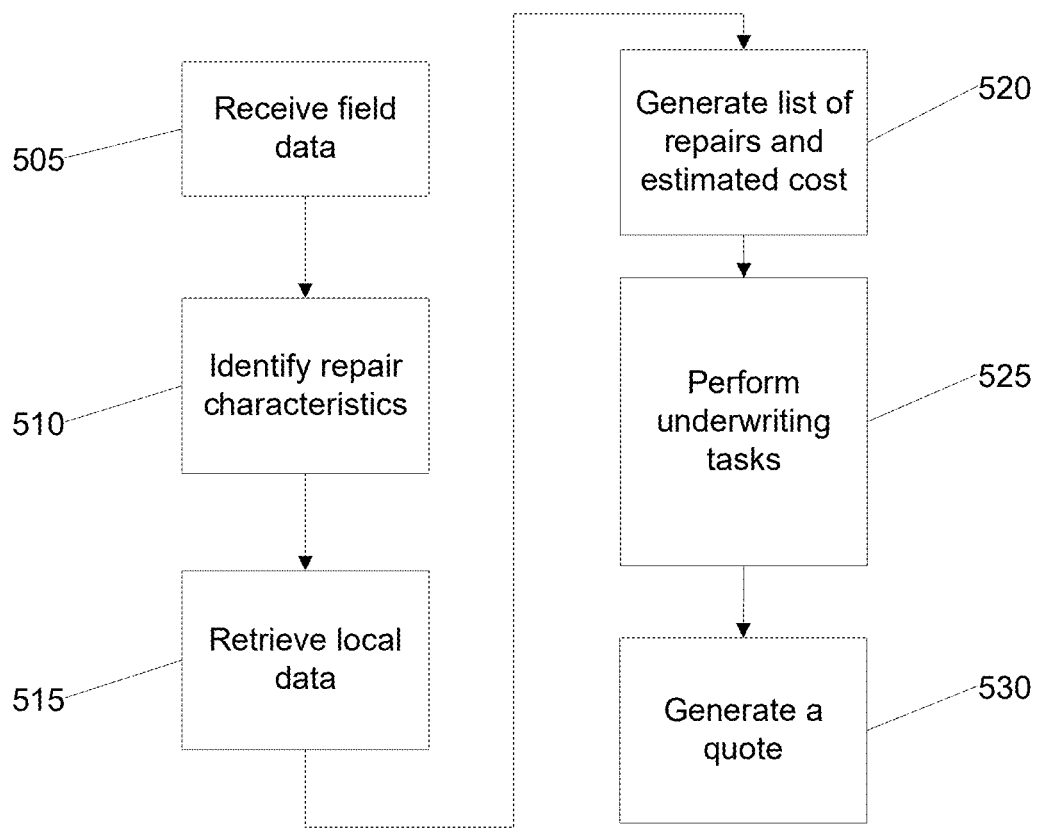
FIG. 5 illustrates another exemplary method for edge-computing at a field vehicle in accordance with one or more aspects described herein.

FIG. 5 depicts an exemplary method for edge-computing at a field vehicle in accordance with one or more aspects described herein.

At step 505, edge-computing system 201 may receive, by a computing device at a field vehicle, field data from one or more UAVs (e.g., Field UAVs 204), where the field data may be indicative of an item for assessment.

Edge-computing system 201 at step 510 may identify, by the computing device and in real-time based on a machine learning model, one or more characteristics of the assessment. In some embodiments, the field data received from the one or more UAVs (e.g., field UAVs 204) may be analyzed by the field data analysis system 206. In some embodiments, the analysis may be performed by the machine learning system 210. For example, the edge-computing system 201 may analyze the field data to determine one or more of a type of material, an amount of material, an amount of labor, and an estimated time to complete the repair.

The edge-computing system 201 may receive, at step 515, local data. The local data may be received from a local information database 212. The local data may include information related to a cost of materials and a cost of labor, and an availability of such resources. In some instances, the local data may relate to data corresponding to locations proximate to the location where the repair is to be performed. In some embodiments, the local data received may be analyzed by the local data analysis system 214. In some embodiments, the analysis may be performed by the machine learning system 210.

In an embodiment, based on the local data, edge-computing system 201 may at step 520 generate a list of repairs and an estimated cost associated with the repairs. In one embodiment, this list may be generated by the estimate generation application 216.

At step 525, edge-computing system 201 may perform underwriting tasks related to the repair of the item. Edge-computing system 201 may in at least one embodiment, utilize the estimate generation application 216 to perform the underwriting tasks.

In another embodiment, based on the underwriting tasks, edge-computing system 201 at step 530 may generate a quote. The generated quote, along with the list of repairs, estimated costs, and an estimated time for the repairs, may be displayed to the consumer (e.g., via user mobile computing device 218), and stored in a consumer profile record.

Figure 6:
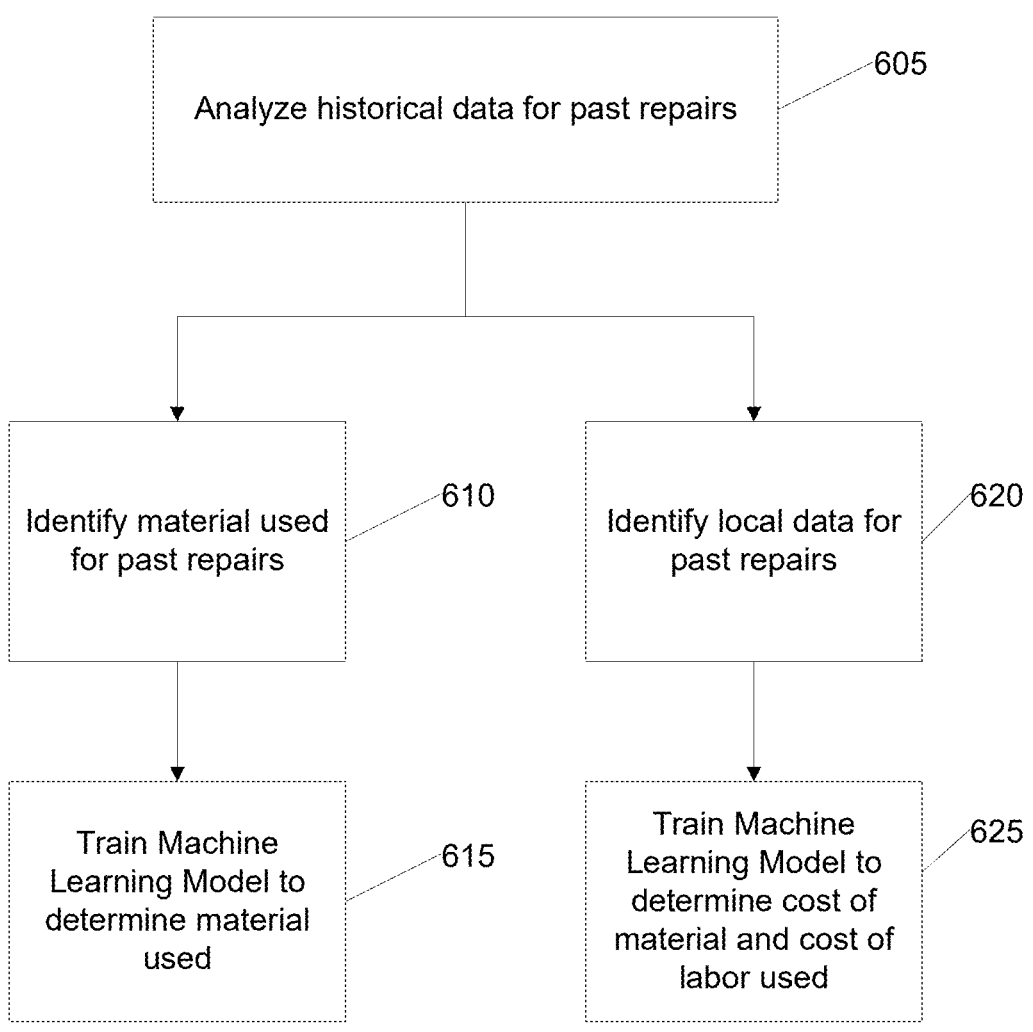
FIG. 6 illustrates another exemplary method for edge-computing at a field vehicle in accordance with one or more aspects described herein.

FIG. 6 depicts another exemplary method for edge-computing at a field vehicle in accordance with one or more aspects described herein. At step 605, edge-computing system 201 may analyze historical data for past repairs. The information may be retrieved from the central data storage platform 220, which may continuously update quote information.

At step 610, edge-computing system 201 may identify the material used for past repairs (type of item and/or type of repair, materials used, suppliers of the materials, etc.).

At step 615, edge-computing system 201 may train the machine learning model (e.g., run by the machine learning system 210) to determine the material used. For example, the machine learning model may apply image processing techniques to associate a type of item with a type of material, an amount of material, etc.

At step 620, edge-computing system 201 may identify local data for past repairs (e.g., cost of materials used, pricing for different suppliers, cost of labor, availability of resources, resources from locations proximate to where the repair is to be performed, etc.).

At step 625, the edge-computing system 201 may train the machine learning model (e.g., run by the machine learning system 210) to determine a cost of materials and a cost of labor. For example, the edge-computing system 201 may analyze the local data and apply a trend analysis to predict future costs of materials and labor. Also, for example, the edge-computing system 201 may analyze data related to material costs, public domain data related to the manufacturing industry and/or a commodities industry, to predict costs.

Figure 7:
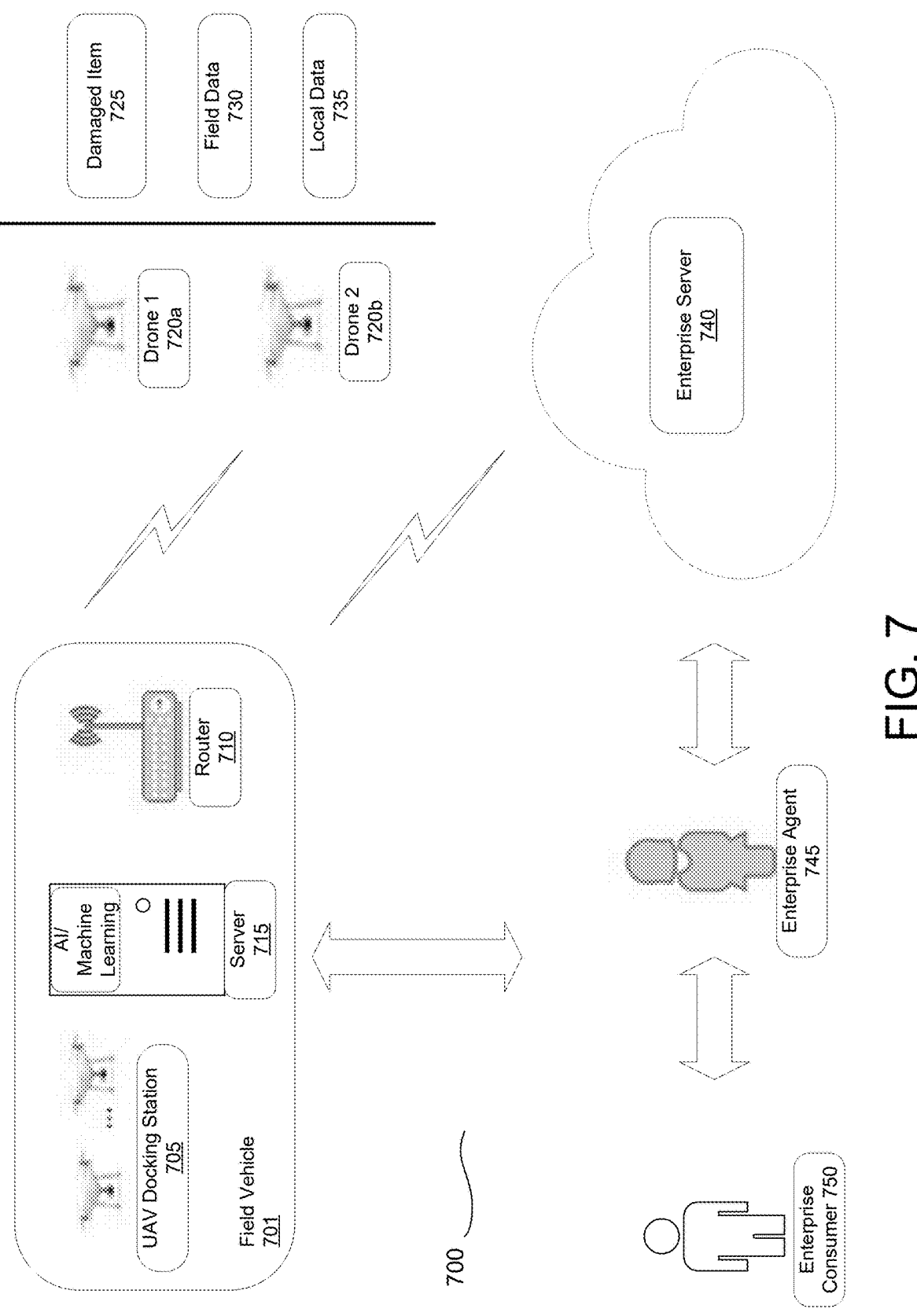
FIG. 7 illustrates an example edge-computing environment in accordance with one or more aspects described herein.

FIG. 7 depicts an example edge-computing environment 700 in accordance with one or more aspects described herein. A field vehicle 701 may comprise any vehicle that includes the edge-computing device to perform processes as described herein. In some embodiments, the field vehicle may comprise a UAV docking station 705 that houses and charges one or more UAVs. In some embodiments, field vehicle 701 may be a UAV carrier. In some embodiments, field vehicle 701 may not provide docking and/or charging functionalities. For example, field vehicle 701 may be equipped with an edge-computing device (e.g., edge-computing device 201), to perform processes as described herein, but may not have an ability to enable UAVs to dock, and/or recharge. The field vehicle 701 may include a server 715 and an artificial intelligence/machine learning system, such as machine learning system 210. The field vehicle may include a router 710 that facilitates communications over private and public networks.

The field vehicle 701 may receive field data 730 from a plurality of UAVs, for example, drone 1, drone 2, etc. that are deployed at a site of an incident or onsite for a property evaluation. For example, drone 1 and drone 2 may be deployed at the site of a flooded region, at a fire, at a property that is being evaluated for damage due to flood, hail, high winds, lightning strike, etc. In some instances, drone 1 and drone 2 may provide field data 730 about item for assessment 725.

The field vehicle 701 may also receive local data 735 from one or more market information databases. The on-board edge-computing system 201 of the field vehicle 701 may analyze the field data, the local data, and may perform underwriting tasks to generate insurance estimates.

In some embodiments, the field vehicle 701 may communicate with an enterprise server 740 via the router 710. For example, on-board server 715 may exchange data and estimates with the enterprise server 740. In some instances, on-board server 715 may retrieve historical data related to past repairs and/or quotes from the enterprise server 740. In some instances, on-board server 715 may update its software applications by communication with the enterprise server 740.

In some embodiments, an enterprise agent 745 may be in communication with the field vehicle 701 and/or the enterprise server 740. In some embodiments, the enterprise agent 745 may operate the input device 115 to interact with the data collection module 101, including providing information about an incident and/or preferences, customer information, account information, etc. In some embodiments, the enterprise agent 745 may be at the site of the incident and communicate with enterprise consumer 750. In some instances, enterprise consumer 750 may be in communication with the field vehicle 701 and may be able to input information directly into the edge-computing device hosted by the field vehicle 701. In some instances, the server 715 nay send a quote or an estimate directly to the enterprise consumer 750.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A method comprising:

receiving, by a computing device at a field vehicle, field data indicative of an item for assessment;

identifying, by the computing device at the field vehicle and based on a machine learning model, one or more characteristics of the assessment, wherein the one or more characteristics includes a repair characteristic;

determining, by the computing device at the field vehicle and based on the machine learning model, that potential damage is undetected in the one or more characteristics by applying the machine learning model to analyze, in real-time, the field data for damage patterns, wherein the determining comprises using the machine learning model to compare identified characteristics against historical damage data to identify potential missed damage indicators, and wherein additional field data is collected when the machine learning model determines that the potential damage indicators suggest undetected damage is present;

retrieving local data related to a geographical location of the item and predicting therefrom future repair or a replacement cost;

performing, by the computing device at the field vehicle, an underwriting task associated with repair of the item based on at least one of the local data or the one or more characteristics;

based on the underwriting task, generating a quote for the assessment at the field vehicle; and sending the quote to a device.

2. The method of claim 1, further comprising:

training the machine learning model to perform the underwriting task.

3. The method of claim 1, further comprising:

training the machine learning model to identify the one or more characteristics based on an analysis of the item.

4. The method of claim 1, wherein retrieving the local data comprises:

retrieving information associated with one or more of a cost of materials, a cost of labor, or an availability of resources from locations proximate to where the repair is to be performed.

5. The method of claim 1, further comprising:

dynamically updating, by the computing device, the local data.

6. The method of claim 1, wherein the field data is received from one or more unmanned autonomous vehicles.

7. The method of claim 6, further comprising:

causing, in real-time and based on the one or more characteristics of the assessment, the one or more unmanned autonomous vehicles to collect additional field data.

8. The method of claim 1, wherein identifying the one or more characteristics of the assessment comprises:

analyzing the field data to determine one or more of a type of material, an amount of material, an amount of labor, or an estimated time to complete the repair.

9. An apparatus, comprising:

a processor; and a memory unit storing computer-executable instructions, which when executed by the processor, cause the apparatus to:

receive, at a field vehicle, field data indicative of an item for assessment;

identify, at the field vehicle, based on a machine learning model, one or more characteristics of the assessment, wherein the one or more characteristics includes a repair characteristic;

determine, at the field vehicle and based on the machine learning model, that potential damage is undetected in the one or more characteristics by applying the machine learning model to analyze, in real-time, the field data for damage patterns wherein the determining comprises using the machine learning model to compare identified characteristics against historical damage data to identify potential missed damage indicators, and wherein additional field data is collected when the machine learning model determines that the potential damage indicators suggest undetected damage is present;

retrieve local data related to a geographical location of the item and predict therefrom future repair or a replacement cost;

perform, at the field vehicle, an underwriting task associated with repair of the item based on at least one of the local data or the one or more characteristics;

generate, at the field vehicle, a quote for the assessment based on at least one of the local data or the one or more characteristics; and send the quote to a device.

10. The apparatus of claim 9, wherein the computer-executable instructions, when executed by the processor, cause the apparatus to:

train the machine learning model to perform an underwriting task associated with repair of the item, wherein the quote is generated based on the underwriting task.

11. The apparatus of claim 9, wherein the computer-executable instructions, when executed by the processor, cause the apparatus to:

train the machine learning model to identify the one or more characteristics based on an analysis of the item.

12. The apparatus of claim 9, wherein the computer-executable instructions, when executed by the processor, further cause the apparatus to retrieve the local data by causing the apparatus to:

retrieve information associated with one or more of a cost of materials, a cost of labor, or an availability of resources from locations proximate to a location where a repair of the item is to be performed.

13. The apparatus of claim 9, wherein the computer-executable instructions, when executed by the processor, cause the apparatus to:

dynamically update the local data.

14. The apparatus of claim 9, wherein the field data is received from one or more unmanned autonomous vehicles.

15. The apparatus of claim 14, wherein the computer-executable instructions, when executed by the processor, cause the apparatus to:

cause, based on the one or more characteristics of the assessment, the one or more unmanned autonomous vehicles to collect additional field data.

16. The apparatus of claim 9, wherein the computer-executable instructions, when executed by the processor, further cause the apparatus to identify the one or more characteristics of the assessment by causing the apparatus to:

analyze the field data to determine one or more of a type of material, an amount of material, an amount of labor, or an estimated time to complete the repair.

17. One or more non-transitory computer-readable media storing instructions that, when executed by a computing device, cause the computing device to:

receive, at a field vehicle, field data indicative of an item for assessment;

identify, at the field vehicle, based on a machine learning model, one or more characteristics of the assessment, wherein the one or more characteristics includes a repair characteristic;

determine, at the field vehicle and based on the machine learning model, that potential damage is undetected in the one or more characteristics by applying the machine learning model to analyze, in real-time, the field data for damage patterns wherein the determining comprising using the machine learning model to compare the identified characteristics against historical damage data to identify potential missed damage indicators, and wherein additional field data is collected when the machine learning model determines that potential damage is present, and wherein additional field data is collected when the machine learning model determines that the potential damage indicators suggest damage is present;

retrieve local data related to a geographical location of the item and predicting therefrom future repair or a replacement cost;

perform, at the field vehicle, an underwriting task associated with repair of the item based on at least one of the local data or the one or more characteristics;

based on the underwriting task, generate a quote for the assessment at the field vehicle; and send the quote to a device.

18. The one or more non-transitory computer-readable media of claim 17, storing further instructions that, when executed by the computing device, cause the computing device to:

train the machine learning model to perform the underwriting task.

19. The one or more non-transitory computer-readable media of claim 17, storing further instructions that, when executed by the computing device, cause the computing device to:

train the machine learning model to identify the one or more characteristics based on an analysis of the item.

20. The one or more non-transitory computer-readable media of claim 17, storing further instructions that, when executed by the computing device, cause the computing device to:

analyze the field data to determine one or more of a type of material, an amount of material, an amount of labor, or an estimated time to complete the repair.

* * * * *